(12) United States Patent
Lee

(10) Patent No.: US 6,702,439 B1
(45) Date of Patent: Mar. 9, 2004

(54) CLIP ON EYEWARE WITH SPRING HINGE

(76) Inventor: Jung I. Lee, 22957 Old Inlet Bridge Dr., Boca Raton, FL (US) 33433

( * ) Notice: Subject to any disclaimer, the term of this patent is extended or adjusted under 35 U.S.C. 154(b) by 0 days.

(21) Appl. No.: 10/346,595

(22) Filed: Jan. 17, 2003

Related U.S. Application Data

(60) Provisional application No. 60/405,214, filed on Aug. 22, 2002.

(51) Int. Cl.[7] .................................................. G02C 9/00
(52) U.S. Cl. .............................. 351/47; 351/48; 351/57; 351/58
(58) Field of Search .............................. 351/47, 48, 57, 351/58, 41, 44, 59

(56) References Cited

U.S. PATENT DOCUMENTS

| | | | |
|---|---|---|---|
| 5,335,025 A | 8/1994 | Wang | |
| 5,376,977 A | 12/1994 | Liu | |
| 5,614,963 A | 3/1997 | Parker | |
| 5,894,335 A | 4/1999 | Hoffman | |
| 6,113,234 A | 9/2000 | Huang | |
| 6,113,235 A | * 9/2000 | Yamamoto | 351/113 |
| 6,116,732 A | 9/2000 | Xiao | |
| 6,164,774 A | 12/2000 | Cate | |
| 6,170,949 B1 | 1/2001 | Mauch | |
| 6,196,679 B1 | 3/2001 | Wong | |
| 6,231,179 B1 | 5/2001 | Lee | |
| 6,260,964 B1 | 7/2001 | Kroman | |
| 6,474,811 B2 | 11/2002 | Liu | |
| 6,488,372 B1 | 12/2002 | Park | |
| 6,550,913 B2 | 4/2003 | Zelman | |
| 6,601,953 B1 | * 8/2003 | Xiao | 351/47 |

OTHER PUBLICATIONS http://www.eyedocs.cc/prod_easyclip.htm"New Products", Easyclip Glasses, EASYCLIP, Newedge Technologies, c2000 Drs. Mandelman, Dobson & Cox.
Flip It, Newport Eyes, Opti–Courier, Dec. 2002.
Flip It, Hinge Technology, "The next generation of sun clip", http://www.newport–eyes.com/pages/879590/index.htm.

* cited by examiner

*Primary Examiner*—Hung X. Dang
(74) *Attorney, Agent, or Firm*—Jon A. Gibbons; Fleit, Kain, Gibbons, Gutman, Bongini & Bianco P.L.

(57) ABSTRACT

An eyeglass frame assembly for coupling clip-on auxiliary spectacles to primary spectacles. The primary spectacles having a pair of cavities formed on the inside surface of rear extensions and the clip-on spectacles having a pair of pins mounted to the outside surface of a pair of hinged extensions, wherein the pins are capable of positively engaging the cavities by exerting outward forces. The hinged extensions allow the clip-on spectacles to swing up and to place the auxiliary lenses mounted within the clip-on spectacles to be outside the vision path of the user.

18 Claims, 18 Drawing Sheets

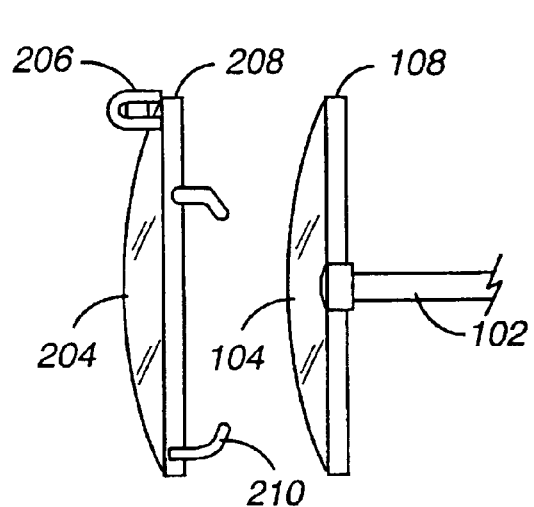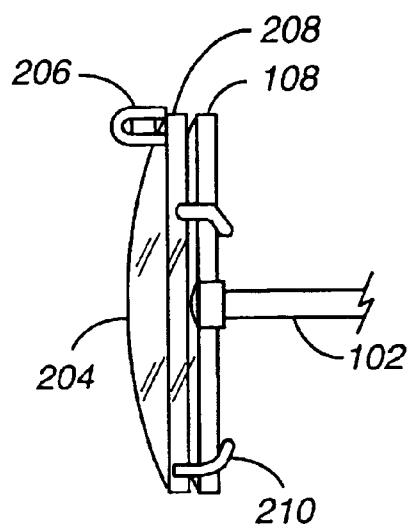
PRIOR ART
FIG. 4A
PRIOR ART
FIG. 4B

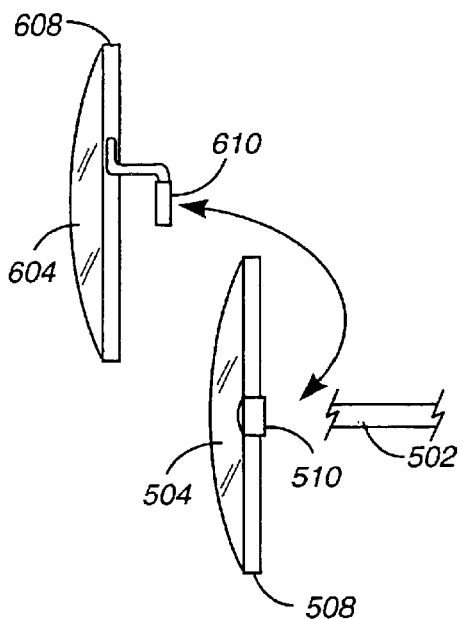
PRIOR ART
*FIG. 8A*
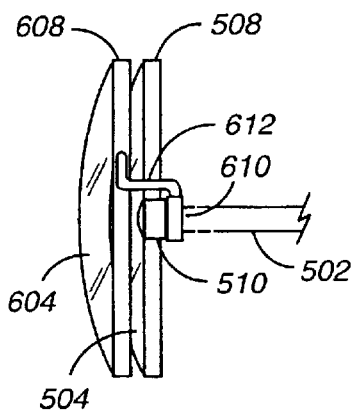
PRIOR ART
*FIG. 8B*
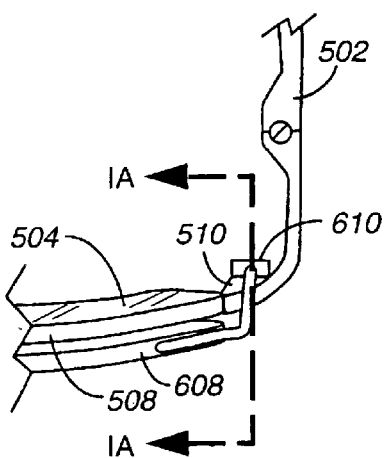
PRIOR ART
*FIG. 9A*
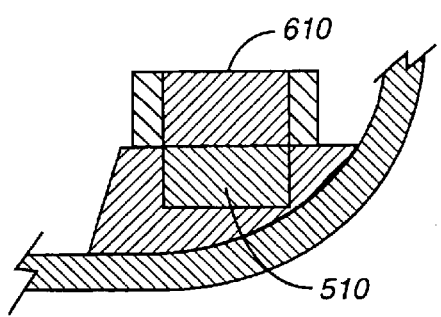
PRIOR ART
*FIG. 9B* SECTION IA-IA

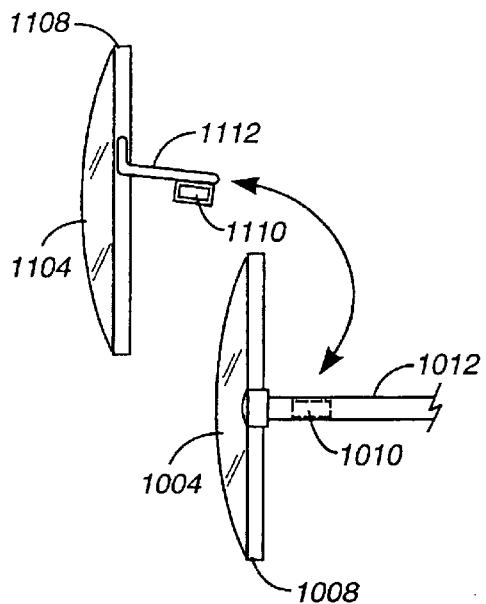
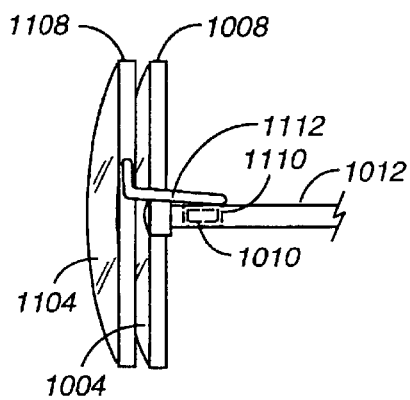
FIG. 13A  FIG. 13B
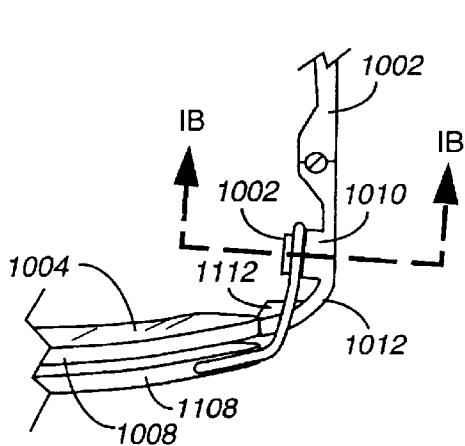
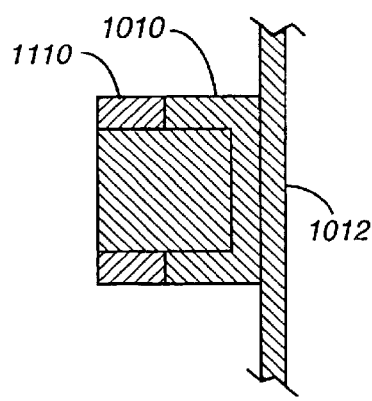
FIG. 14A  FIG. 14B VIEW IB-IB

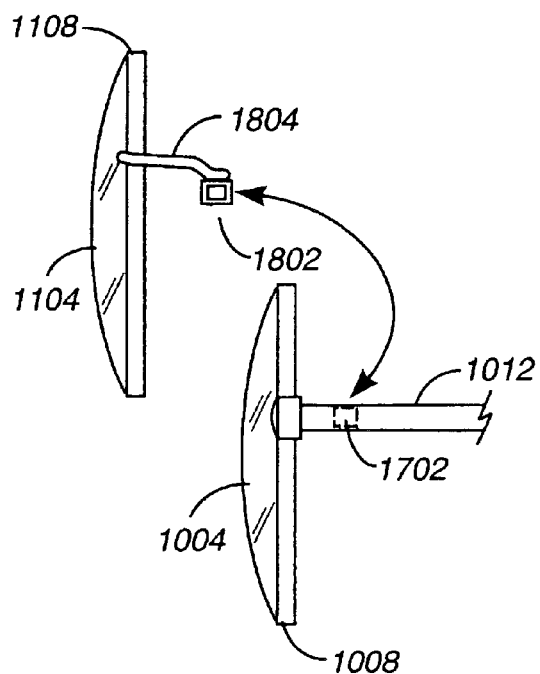
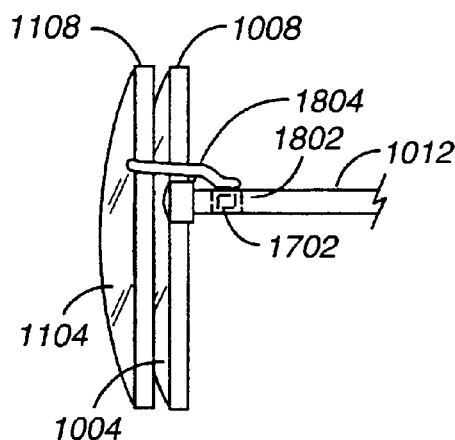
*FIG. 20A*  *FIG. 20B*
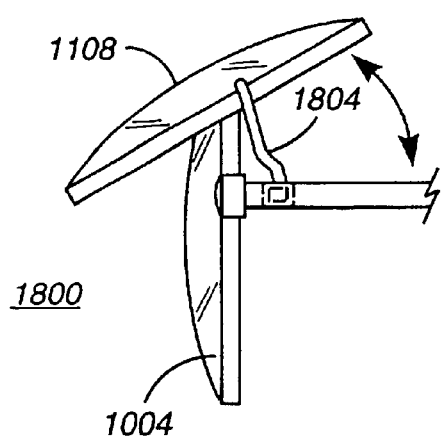
*FIG. 20C*

VIEW IC-IC

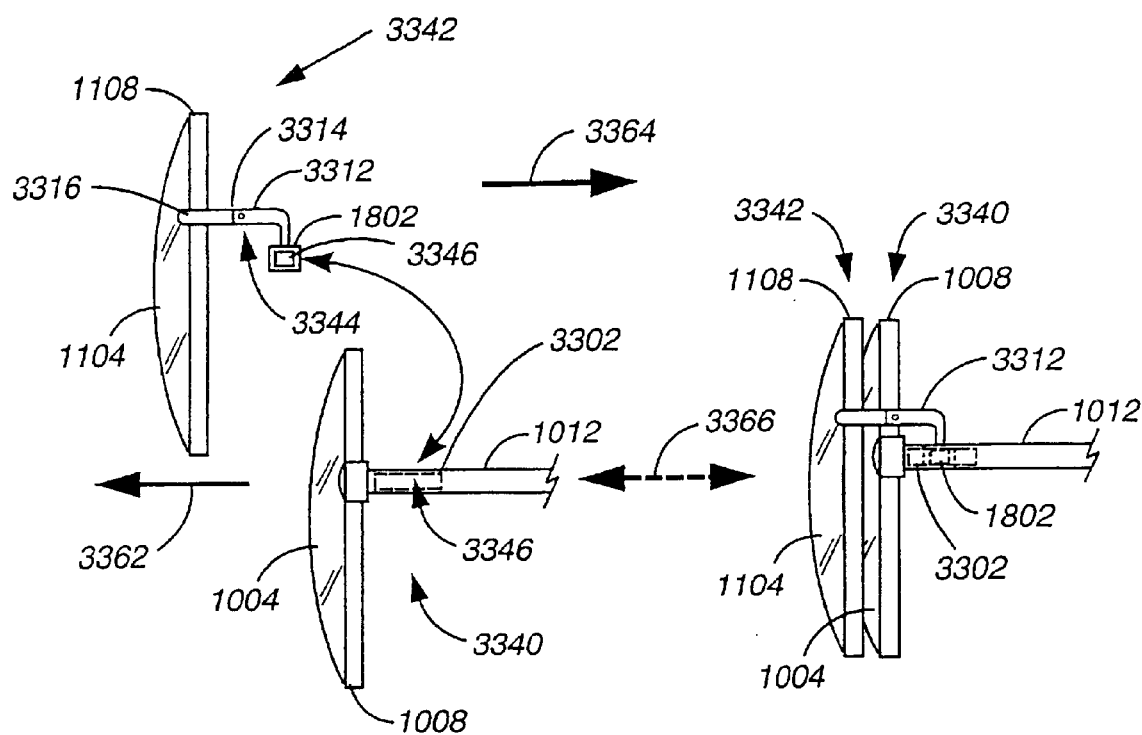
FIG. 33A  FIG. 33B
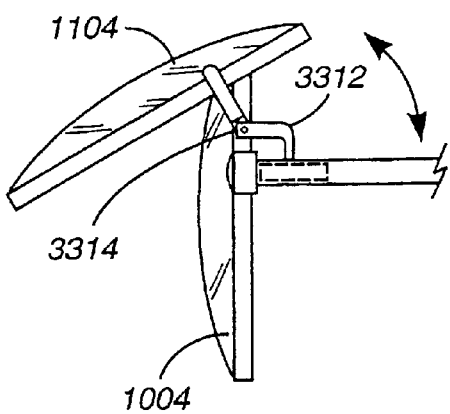
FIG. 33C

CLIP ON EYEWARE WITH SPRING HINGE

CROSS REFERENCE TO RELATED APPLICATIONS

This application claims priority from U.S. Provisional Application No. 60/405,214, filed Aug. 22, 2002, which is based upon PCT Application Serial No. PCT/US02/16478 filed May 24, 2002, which is based upon U. S. Provisional Application No. 60/312,124, filed Aug. 14, 2001, the disclosure of all of the above listed documents is hereby incorporated herein by reference in their entirety.

BACKGROUND OF THE INVENTION

1. Field of the Invention

The invention disclosed broadly relates to eyeglasses, and more particularly relates to an improved arrangement for attachment of an auxiliary or "clip-on" pair of lenses to a primary pair of eyeglasses.

2. Description of the Related Art

To alleviate the need to carry multiple pairs of eyeglasses, various types of "clip-on" auxiliary lenses have been introduced. Primarily, this allows clip-on sunglasses to be attached to a pair of primary prescription eyeglasses. The market success of the inventions within this art is often measured by such factors as security of attachment, aesthetic appearance, and comfort to the user.

One type of invention found in the prior art is shown in FIGS. 1–4B. The configuration consists of a set of primary eyeglasses 100 and a separate set of auxiliary lenses 200 containing a number of claws 210. The claws 210 are used to attach or clip the auxiliary lenses 200 to the frame 102 of the primary eyeglasses 100. FIG. 8 illustrates the arrangement of the primary 100 and auxiliary lenses 200 in a decoupled state (FIG. 4A) and a coupled state (FIG. 4B). This arrangement has a number of shortcomings. For one thing, the arrangement is cumbersome and unattractive. Furthermore, the attachment members can often cause scratching of the primary lenses 100 as the auxiliary lenses 200 are taken on and off. This is, especially problematic where the primary lenses 100 and/or the auxiliary lenses 200 are made of plastic which is more prone to scratching as opposed to harder surfaces such as those made from glass.

Yet another class of-clip-on inventions (shown in FIGS. 5–9B) uses magnets as the primary means of attaching the auxiliary lenses 600 to the primary eyeglasses 500. Magnets 610 on the auxiliary lenses 600 line up with corresponding magnets 510 on the frames 502 of the primary eyeglasses 500 to form a surface area that is designed to hold the auxiliary lenses 600 in place. FIG. 4 illustrates the arrangement of the primary 500 and auxiliary lenses 600 in a decoupled state (FIG. 8A) and a coupled state (FIG. 8B). FIG. 9 contains a view of the cross-sectional area of intersection of the magnets 610 on the auxiliary lenses 600 with the magnets 510 on the primary eyeglass frames 502.

However, there are several drawbacks associated with the various attachment implementations that use magnets. One drawback is that since magnets are heavy, the magnets required on both the auxiliary lenses 600 and the primary eyeglasses 500 tend to add a substantial amount of weight to the overall assembly. The additional weight results in discomfort to the user. Another drawback is that magnets often cause drawbacks when placed near electronic equipment such as computers or floppy disks. In other words, inadvertently placing either the auxiliary or primary spectacles near such equipment can result in property damage as a result of the magnetic fields that are generated.

A more fundamental drawback with magnetic clip-on lenses 600 concerns the integrity of the attachment to the primary eyeglasses 500. Since most magnetic attachment implementation do not account for dynamic loads in all directions, jarring movements that occur during, for example, exercise will cause the auxiliary lenses 600 to become suddenly detached from the primary spectacles 500. Furthermore, regardless of how secure the attachment mechanism is at the time of manufacture, a number of factors can and often will cause the effectiveness of the magnets to degrade over time.

Additionally, both previous styles of clip-on lenses are separate, detachable pieces that must be attached or detached when going from indoors to outdoors, or vice versa. The person wearing the glasses must scramble to find the auxiliary lenses and reattach them. This process is clumsy and time consuming. Also, the chances of misplacing or losing the auxiliary lenses are increased.

Previous styles of clip-on lenses utilize clip-on frame extensions, such as the clip-on frame extensions 612 illustrated in FIGS. 6 through 9B. These clip-on frame extensions protrude from the clip-on frame device and can tear or scratch materials or surfaces with which they come into contact. In addition, these clip-on frame extensions are often light and fragile in order to reduce the weight and bulk of the clip-on lens device. The often fragile construction of the clip-on frame extensions make them subject to breakage or damage from contact with surfaces or material. For example, clip-on frame extensions often catch on the material of a shirt pocket when the clip-on frame extension is placed into or removed from that pocket, possibly resulting in a tear of the pocket material or the bending or breakage of the clip-on frame extension.

Therefore a need exists to overcome the drawbacks and problems with the prior art as discussed above, and particularly for an improved arrangement for attachment of an auxiliary or "clip-on" pair of lenses to a primary pair of eyeglasses.

SUMMARY OF THE INVENTION

Briefly, in accordance with the present invention, an eyeglass frame assembly for coupling clip-on auxiliary spectacles to primary spectacles, the clip on auxiliary spectacles having a pair of hinged extension arms with a pair of pins mounted to outside surface of each hinged extension arm. The pins on the hinged extension arms positively engage a pair of cavities formed on the inside of frame extensions connected to a primary lens frame on the primary spectacles. The hinged extension arms include a hinge that allows the auxiliary lens frame to be positioned in and out of the vision path of the user while the auxiliary spectacles are attached to the primary spectacles.

BRIEF DESCRIPTION OF THE DRAWINGS

The subject matter that is regarded as the invention is particularly pointed out and distinctly claimed in the claims at the conclusion of the specification. The foregoing and other features, and advantages of the invention will be apparent from the following detailed description taken in conjunction with the accompanying drawings. Additionally, the left-most digit of a reference number identifies the drawing in which the reference number first appears.

FIG. 4A is a side view, illustrating a state wherein the primary spectacles of FIG. 1 and the clip-on spectacles of FIG. 2 are decoupled with each other.

FIG. 4B is a side view, illustrating a state wherein the primary spectacles of FIG. 1 and the clip-on spectacles of FIG. 2 are coupled with each other.

FIG. 8A is a side view, illustrating a state wherein the primary spectacles of FIG. 5 and the clip-on spectacles of FIG. 6 are decoupled with each other.

FIG. 8B is a side view, illustrating a state wherein the primary spectacles of FIG. 5 and the clip-on spectacles of FIG. 6 are coupled with each other.

FIG. 9A is a top view, illustrating a state wherein the primary spectacles of FIG. 5 and the clip-on spectacles of FIG. 6 are coupled with each other.

FIG. 9B is a cross-sectional view taken along the line IA—IA, illustrating a state wherein the primary spectacles of FIG. 5 and the clip-on spectacles of FIG. 6 are coupled with each other.

FIG. 13A is a side view, illustrating a state wherein the primary spectacles of FIG. 10 and the clip-on spectacles of FIG. 11 are decoupled with each other according to a preferred embodiment of the present invention.

FIG. 13B is a side view, illustrating a state wherein the primary spectacles of FIG. 10 and the clip-on spectacles of FIG. 11 are coupled with each other according to a preferred embodiment of the present invention.

FIG. 14A is a top view, illustrating a state wherein the primary spectacles of FIG. 10 and the clip-on spectacles of FIG. 11 are coupled with each other according to a preferred embodiment of the present invention.

FIG. 14B is a cross-sectional view taken along the line IB—IB, illustrating a state wherein the primary spectacles of FIG. 10 and the clip-on spectacles of FIG. 11 are coupled with each other according to a preferred embodiment of the present invention.

FIG. 20A is a side view, illustrating a state wherein the primary spectacles of FIG. 17 and the clip-on spectacles of FIG. 18 are decoupled with each other according to an alternative embodiment of the present invention.

FIG. 20B is a side view, illustrating a state wherein the primary spectacles of FIG. 17 and the clip-on spectacles of FIG. 18 are coupled with each other according to an alternative embodiment of the present invention.

FIG. 20C is a side view, illustrating a state wherein the primary spectacles of FIG. 17 and the clip-on spectacles of FIG. 18 are coupled with each other and in a "flip-up" position according to an alternative embodiment of the present invention.

FIG. 33A is a side view, illustrating a state wherein the primary spectacles and the clip-on spectacles are decoupled with each other according to an alternative embodiment of the present invention, the clip-on spectacles containing a pair of spring hinged frame extensions.

FIG. 33B is a side view, illustrating a state wherein the primary spectacles and the clip-on spectacles of FIG. 33A are coupled with each other according to an alternative embodiment of the present invention.

FIG. 33C is a side view, illustrating a state wherein the primary spectacles and the clip-on spectacles of FIG. 33A are coupled with each other and in a "flip-up" position according to an alternative embodiment of the present invention.

DETAILED DESCRIPTION OF THE PREFERRED EMBODIMENTS

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

The present invention, according to a preferred embodiment, overcomes drawbacks and problems with the prior art by coupling a pair of auxiliary lenses to a set of primary eyeglasses by using more secure mounting mechanism. A preferred embodiment and several alternate embodiments displaying slight variations of the present invention are now described.

Figure 1:
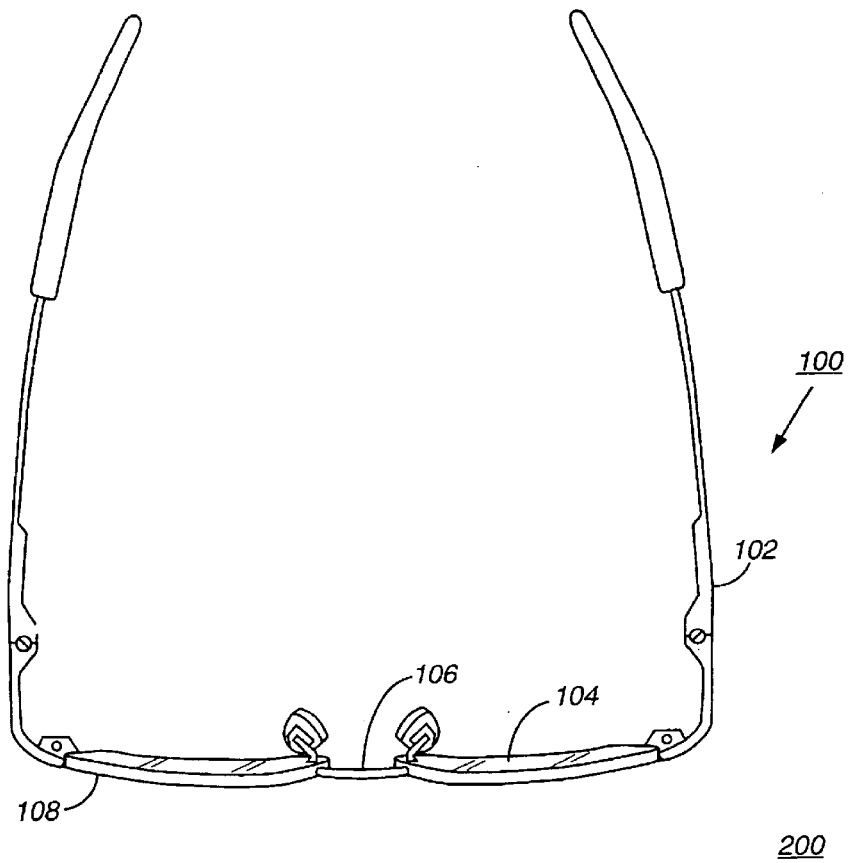
FIG. 1 is a top view of a first type of conventional primary spectacles.
Figure 2:
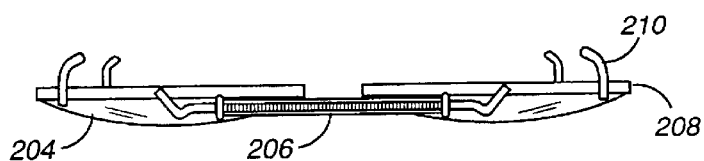
FIG. 2 is a top view of a first type of conventional clip-on spectacles.
Figure 3:
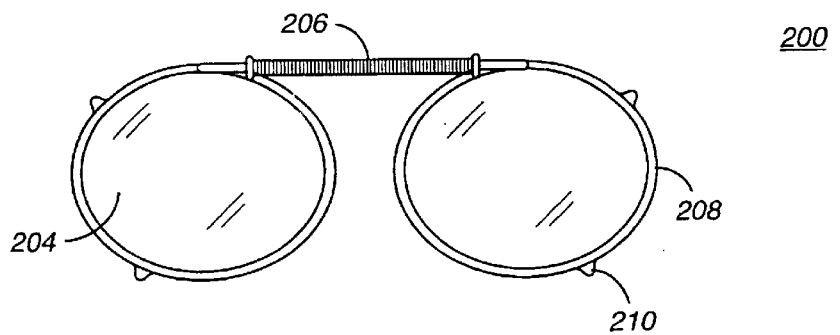
FIG. 3 is a front view of the clip-on spectacles shown in FIG. 2.
Figure 5:
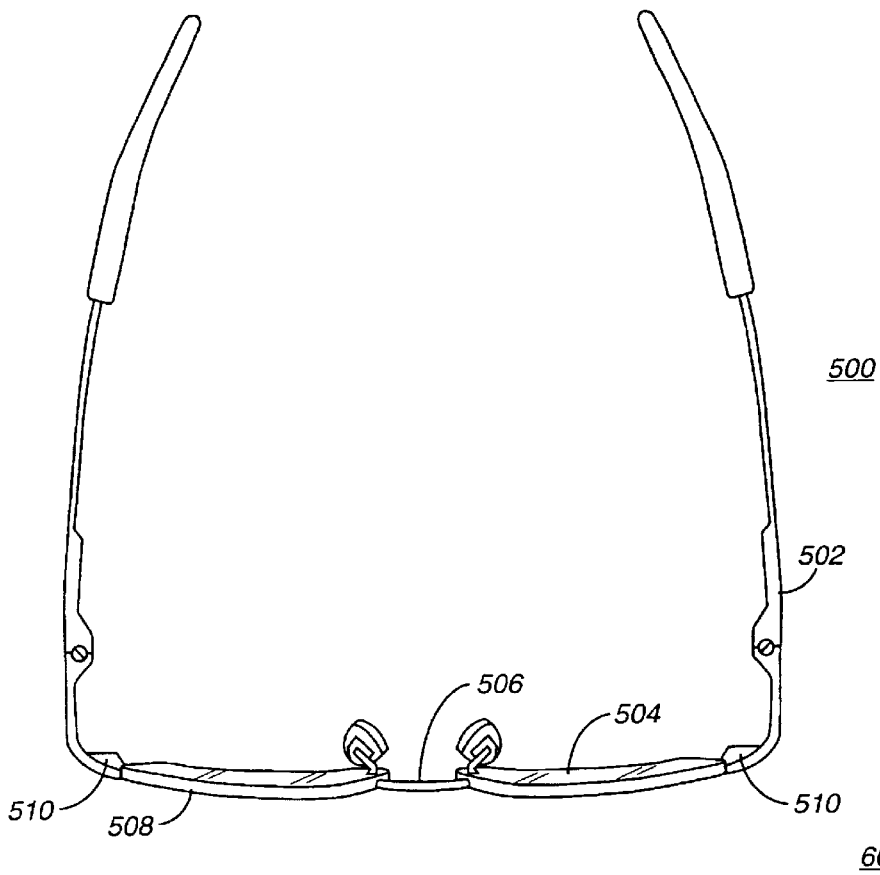
FIG. 5 is a top view of a second type of conventional primary spectacles.
Figure 6:
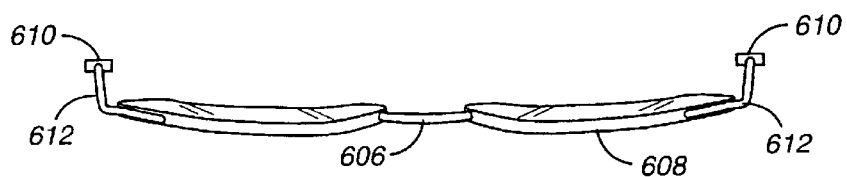
FIG. 6 is a top view of a second type of conventional clip-on spectacles.
Figure 7:
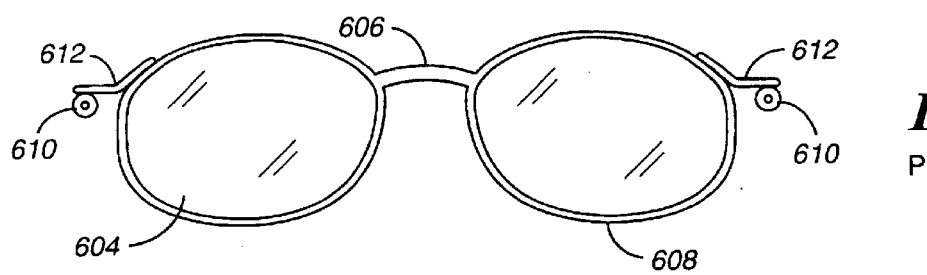
FIG. 7 is a front view of the clip-on spectacles shown in FIG. 6.
Figure 10:
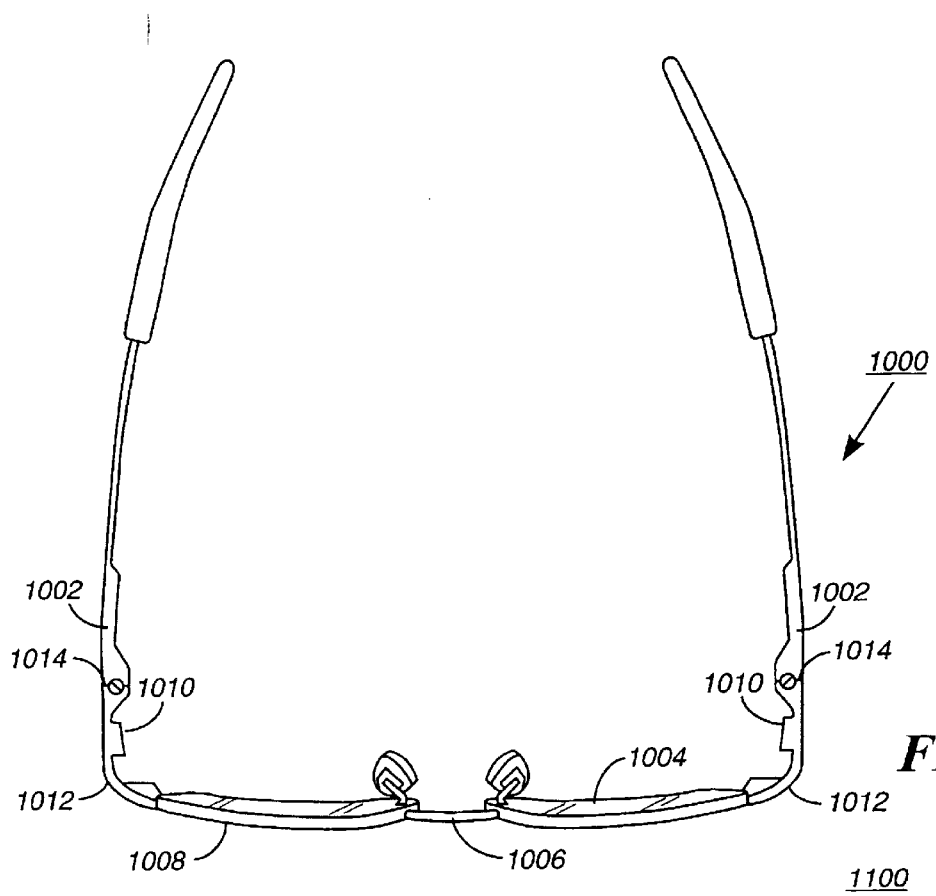
FIG. 10 is a top view of primary spectacles according to a preferred embodiment of the present invention.

Referring to FIG. 10 there is shown a topside view of a pair of primary spectacles 1000 according to one embodiment of the present invention. The spectacles include a primary lens frame 1008, which contains a pair of primary lenses 1004. The primary lens frame 1008 also includes a primary nose bridge 1006. Mounted to each side of the primary lens frame 1008 is a primary frame extension 1012. Each primary frame extension 1012 includes a first end that connects a rear extension to the outside of the primary lens frame 1008. The rear extensions are positioned such that they are substantially parallel to each other and substantially perpendicular to the primary lens frame 1008. There is an open cavity 1010 formed on the inside surface of each rear extension, such that the opening of the cavity 1010 faces inward towards the opening of the opposite cavity. The primary spectacles also include a pair of arms 1002 that are connected to a second end of the primary frame extensions 1012 by hinges 1014 which allow the arms 1002 to pivot. When the arms 1002 are in an open position, they extend backwards to engage a user's ears.

Figure 11:
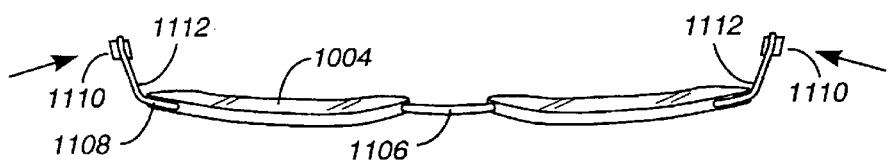
FIG. 11 is a top view of clip-on spectacles according to a preferred embodiment of the present invention.
Figure 12:
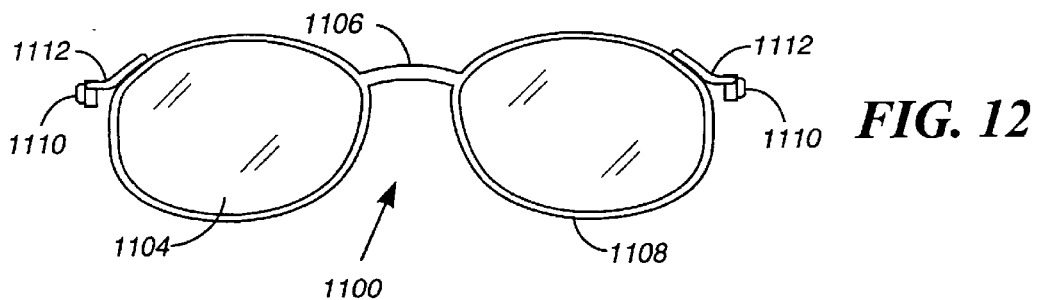
FIG. 12 is a front view of the clip-on spectacles shown in FIG. 11.

FIG. 11 and FIG. 12 show a topside view and a frontal view respectively of clip-on auxiliary spectacles 1100 according to one embodiment of the present invention. The clip-on auxiliary spectacles 1100 include an auxiliary lens frame 1108 which includes an auxiliary nose bridge 1106 and a pair of auxiliary lenses 1104 contained within the lens frame 1108. The clip-on spectacles 1100 also include a pair of flexible legs (frame extensions) 1112 which are attached to the outer ends of the auxiliary lens frame 1108. Furthermore, a pad 1110, typically non-metallic, is mounted to the outside surface of each flexible leg 1112. The pads 1110 are preferably made of such impact absorbing materials such as rubber, silicon, or plastic.

Figures 16A, 16B:
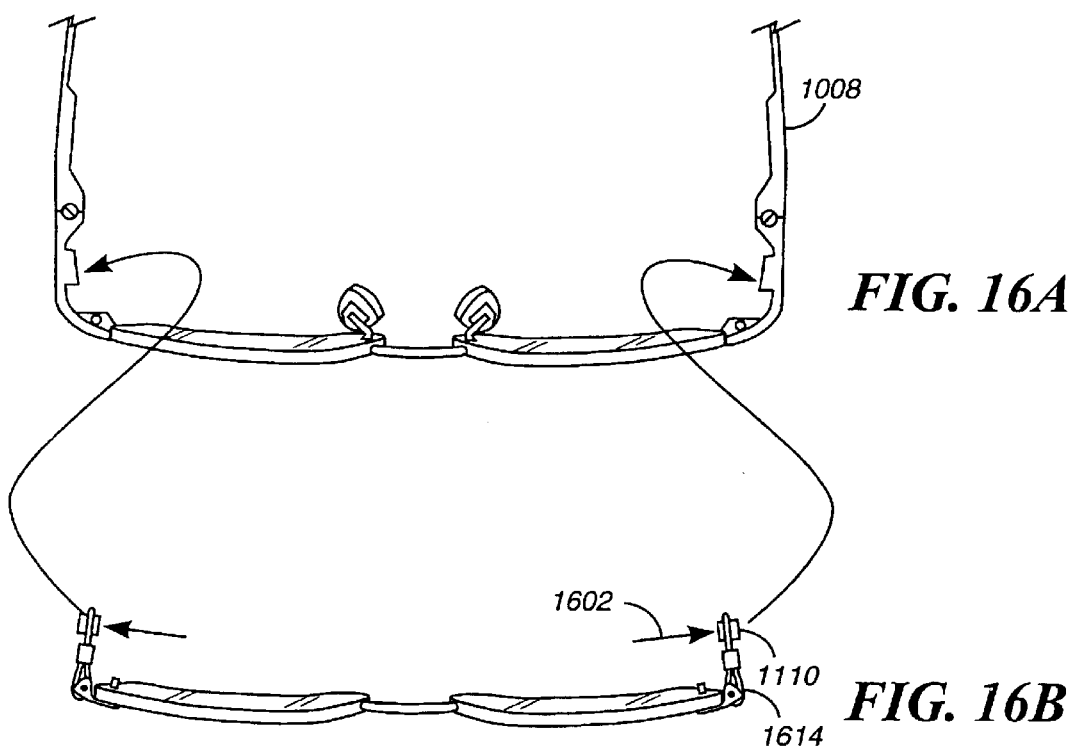
FIGS. 16A and 16B are a top view, illustrating an outward spring action of the flexible leg pairs of FIG. 14 of the clip-on spectacles of FIG. 11, according to another embodiment of the present invention.

FIGS. 13A, 13B, 14A, and 14B illustrate how the clip-on auxiliary spectacles 1100 can be coupled to the primary spectacles 1000. Outward springing forces that are exerted through the flexible legs 1112 mounted on the auxiliary spectacles achieve a secure coupling. The outward springing forces cause the pads 1110 on the outside of the flexible legs 1112 to engage the open cavities 1010 that are on the inside of the primary frame extensions 1012 of the primary spectacles. The outward springing forces are created by making the distance between the pads 1110 mounted to the flexible legs 1112 greater than the distance between the cavities 1010. Thus, the pads 1110 mounted to the flexible legs 1112 must be flexed inwards before being fitted into the cavities 1010 on the primary spectacles 1000 as shown in step 1602 of FIGS. 16A and 16B. Also shown in FIG. 16B are optional spring-loaded hinges 1614 on the auxiliary frame extensions 1112 which enhance the outward springing forces by exerting an additional outward bias on each of the pads 1110.

Figure 15:
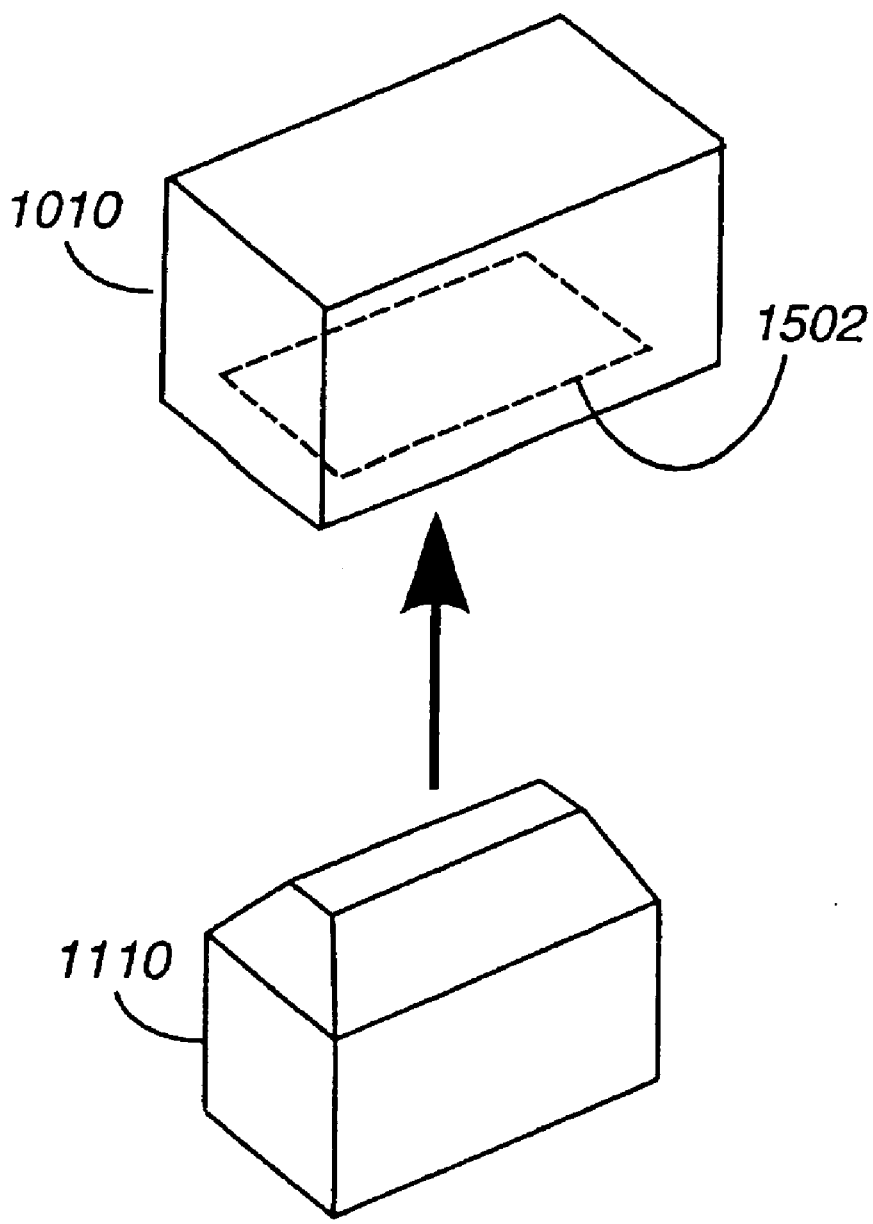
FIG. 15 is a close-up view, illustrating a state wherein an open cavity on the primary spectacles of FIG. 10 and a pad on the clip-on spectacles of FIG. 11 are not engaged with each other.

The mechanism for coupling clip-on auxiliary spectacles to primary spectacles according to the present invention has a number of advantages over the prior art. To begin with, the outward springing forces ensure that the pads will stay firmly engaged with the cavities on the primary spectacles. Since the pads are contained within the cavities when the clip-on spectacles are coupled to the primary spectacles, the clip-on spectacles can withstand jarring forces from all possible directions. FIG. 15 shows a closer view of how the pad 1110 inserts into the cavity 1010 on the primary spectacles. Such jarring forces, which can occur during exercise, often cause other types of clip-on spectacles to disengage from the primary spectacles. Also, the lightweight of the pads 1110 avoids the discomfort that results from heavier assemblies that use magnets. Furthermore, the use of pads also prevents scratching of the primary spectacles, which often occurs during repeated engaging and disengaging of other types of clip-ons.

Figure 17:
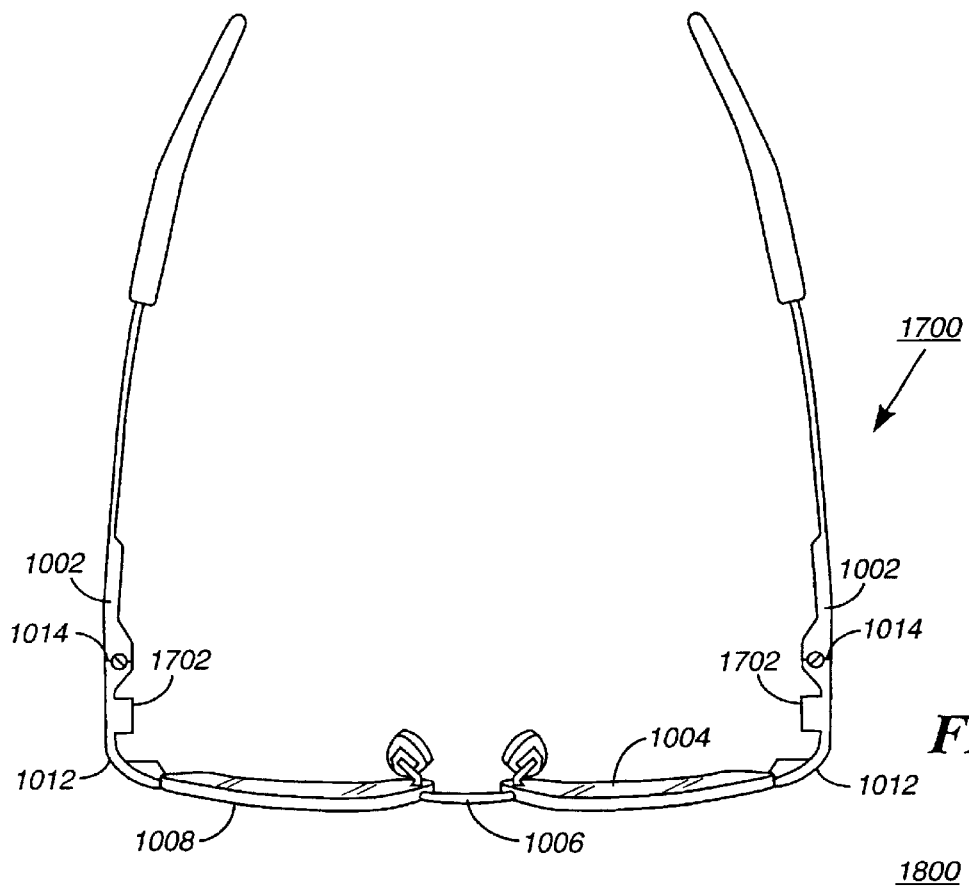
FIG. 17 is a top view of primary spectacles according to an alternative embodiment of the present invention.

An alternative embodiment is depicted in FIGS. 17–21. Referring to FIG. 17, there is shown a topside view of a pair of primary spectacles 1700 similar to those described above. The spectacles include a primary lens frame 1008, which contains a pair of primary lenses 1004. The primary lens frame 1008 also includes a primary nose bridge 1006. Mounted to each side of the primary lens frame 1008 is a primary frame extension 1012. Each primary frame extension 1012 includes a first end that connects a rear extension to the outside of the primary lens frame 1008. The rear extensions are positioned such that they are substantially parallel to each other and substantially perpendicular to the primary lens frame 1008. There is an open cavity 1702 formed on the inside surface of each rear extension, such that the opening of the cavity 1702 faces inward towards the opening of the opposite cavity. The primary spectacles also include a pair of arms 1002 that are connected to a second end of the primary frame extensions 1012 by hinges 1014 which allow the arms 1002 to pivot. When the arms 1002 are in an open position, they extend backwards to engage a user's ears.

Figure 18:
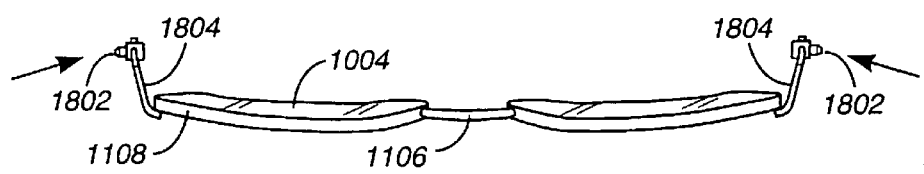
FIG. 18 is a top view of clip-on spectacles according to an alternative embodiment of the present invention.
Figure 19:
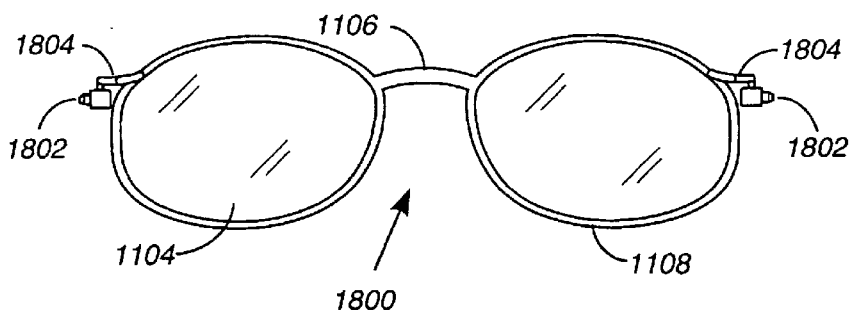
FIG. 19 is a front view of the clip-on spectacles shown in FIG. 18.

FIG. 18 and FIG. 19 show a topside view and a frontal view respectively of clip-on auxiliary spectacles 1800 according to an alternative embodiment of the present invention. The clip-on auxiliary spectacles 1800 include an auxiliary lens frame 1108 which includes an auxiliary nose bridge 1106 and a pair of auxiliary lenses 1104 contained within the lens frame 1108. The clip-on spectacles 1800 also include a pair of extension legs 1804 which are attached to the outer ends of the auxiliary lens frame 1108. Furthermore, a replaceable spring-activated pin assembly 1802 is mounted to the outside surface of each leg 1804.

Figure 20D:
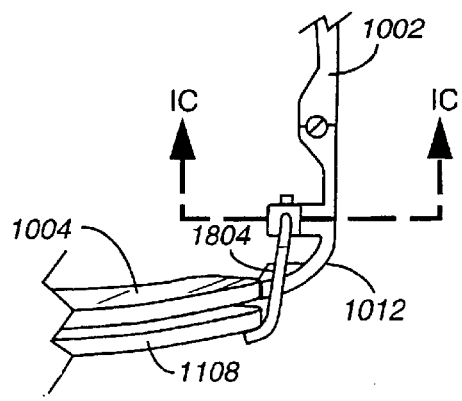
FIG. 20D is a top view, illustrating a state wherein the primary spectacles of FIG. 17 and the clip-on spectacles of FIG. 18 are coupled with each other according to an alternative embodiment of the present invention.

FIGS. 20A, 20B, 20C, 20D and 20E illustrate how the clip-on auxiliary spectacles can be coupled to the primary spectacles. Outward springing forces that are exerted through the replaceable spring-activated pins 1802 mounted on the auxiliary spectacles achieve a secure coupling. The outward springing forces cause the spring-activated pins 1802 (shown in detail in FIG. 21) on the outside of the legs 1804 to engage the open cavities 1702 that are on the inside of the primary frame extensions 1012 of the primary spectacles. This arrangement has the additional advantage, as shown in FIG. 20C, of pivotally mounting the auxiliary spectacles 1800, thus allowing the user to flip the auxiliary spectacles up above the primary spectacles when the auxiliary lenses 1100 are not in use. The extension legs 1804 of the auxiliary spectacles must be long enough to ensure that the auxiliary lenses 1104 do not get scratched during the flipping procedure. This allows the user, for instance, if the auxiliary lenses are sunglasses, to walk from outdoors to indoors without having to remove the auxiliary lenses. Also, it allows for a pair of stronger lenses, such as reading glasses, to be available to the user when necessary.

Figure 20E:
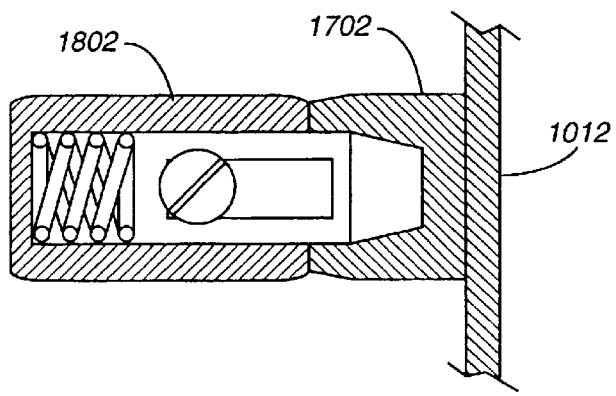
FIG. 20E is a cross-sectional view taken along the line IC—IC, illustrating a state wherein the primary spectacles of FIG. 17 and the clip-on spectacles of FIG. 18 are coupled with each other according to an alternative embodiment of the present invention.

The cross-sectional area of FIG. 20E illustrates how the spring-activated pin 1802 of the auxiliary spectacles fits into the open cavity 1702 located on the primary frame extensions 1012 of the primary spectacles. Although the embodiment described here teaches that the location of the open cavities 1702 is on the inside of the frame, it should be obvious to one skilled in the art that this is not a limitation of the present invention and many other positions are within the true scope and spirit of the present invention. The positioning of the open cavities 1702 could also be on the outside, top, or bottom of the primary frame extensions 1012 or any convenient location on the primary lens frame 1008, on the condition that the placement of the spring-activated pins 1802 be designed to have a corresponding location.

Figure 21:
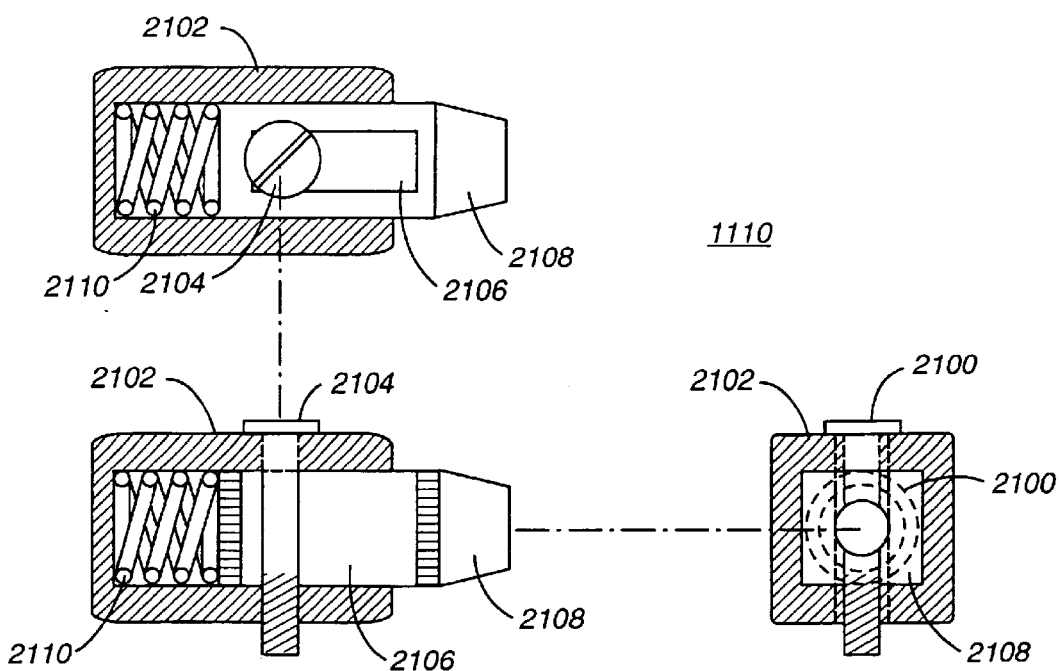
FIG. 21 is a three view drawing of a preferred embodiment of a spring-activated pin of the clip-on spectacles of FIG. 18.

FIG. 21 illustrates a preferred embodiment of the replaceable spring-activated pin assembly 1802. An open cavity 2102 is mounted on the end of each leg 1804 of the auxiliary frame 1108. The open cavity 2102 is designed to house a spring 2110 and barrel 2108 assembly. The spring 2110 is inserted into the open cavity 2102 first, followed by a barrel 2108. The barrel 2108 is secured into the open cavity 2102 by a screw 2104 which is inserted through the top portion of the open cavity 2102, through a slot 2106 located in the center of the barrel 2108, and threaded into the bottom portion of the open cavity 2102. The barrel is allowed to move longitudinally within the open cavity 2102 located on the auxiliary frame 1108, the distance allowed by the length of the slot 2106, to engage the open cavities 1702 positioned on the primary frame 1008. The auxiliary spectacles 1800 are held securely in place by the force of the springs 2110 inside the spring-activated pin assemblies 1802. The feature of having a screw 2104 as the fastening mechanism allows for easy replacement of the pin assembly 1802 when the part becomes worn (as will tend to happen with multiple insertions and extractions).

Figure 22:
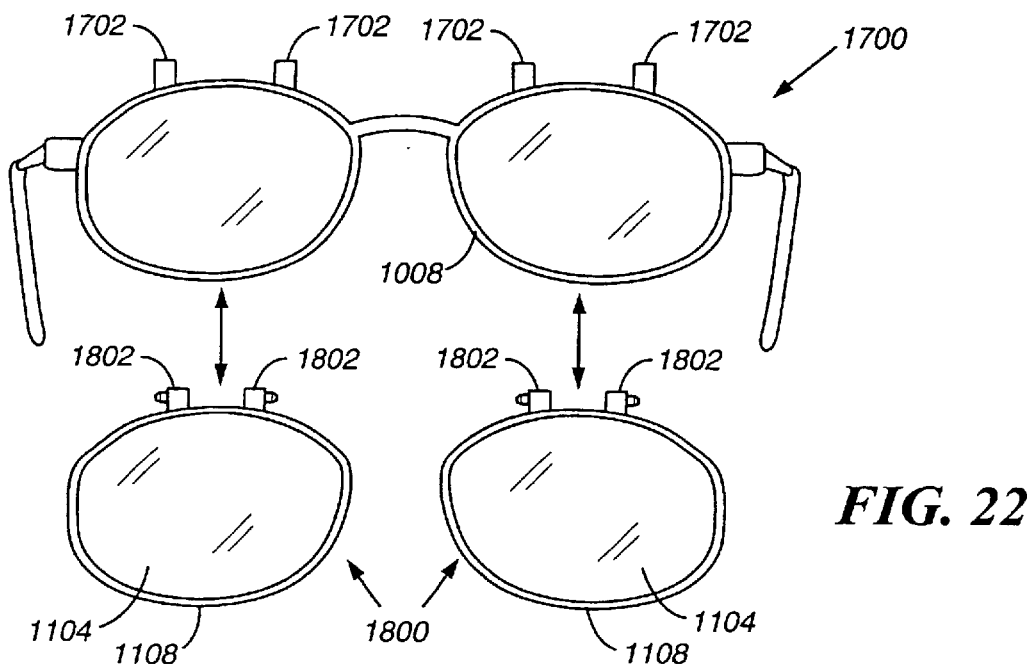
FIGS. 22, 23, and 24 are front views of primary spectacles and auxiliary lenses according to alternative embodiments of the present invention.

The remaining figures illustrate different embodiments to the auxiliary eyeglass-mounting system of the present invention. In FIG. 22, the primary spectacles 1700 include open cavity mounting boxes 1702 located on the top of primary lens frame 1008. The auxiliary spectacles 1800 comprise separate auxiliary lenses 1104, each lens being encased in its own lens frame 1108. The auxiliary lenses 1104 are not connected by a nose bridge, but comprise two spring-activated pin assemblies 1802 located at the top of each frame. Each auxiliary lens 1104 is mounted individually to the primary lens frame 1008 by inserting the spring-activated pins 1802 into the open cavity mounting boxes 1702. The auxiliary lenses 1104 can move ("flip up") independently of each other.

Figure 23:
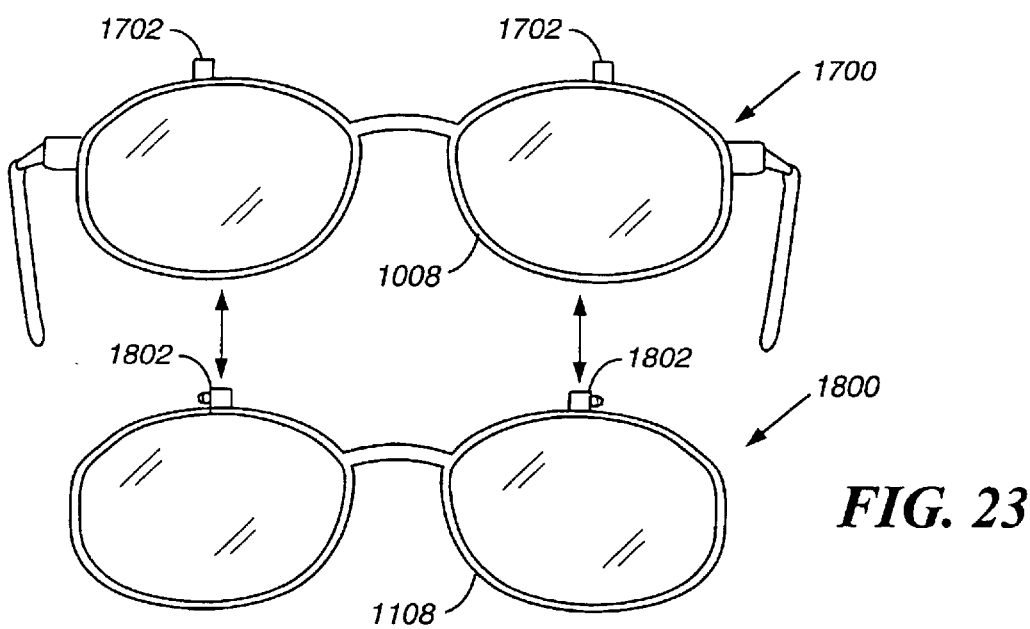

Referring to FIG. 23, the location of the open cavity mounting boxes 1702, in this instance, is on the top of the primary lens frame 1008. Spring-activated pins 1802 located on the top of the an auxiliary frame 1108 are inserted into the mounting boxes 1702 to fasten the auxiliary spectacles 1800 to the primary spectacles 1700. Again, using this mounting scheme, the auxiliary spectacles 1800 may be "flipped" out of the path of vision when not in use.

Figure 24:
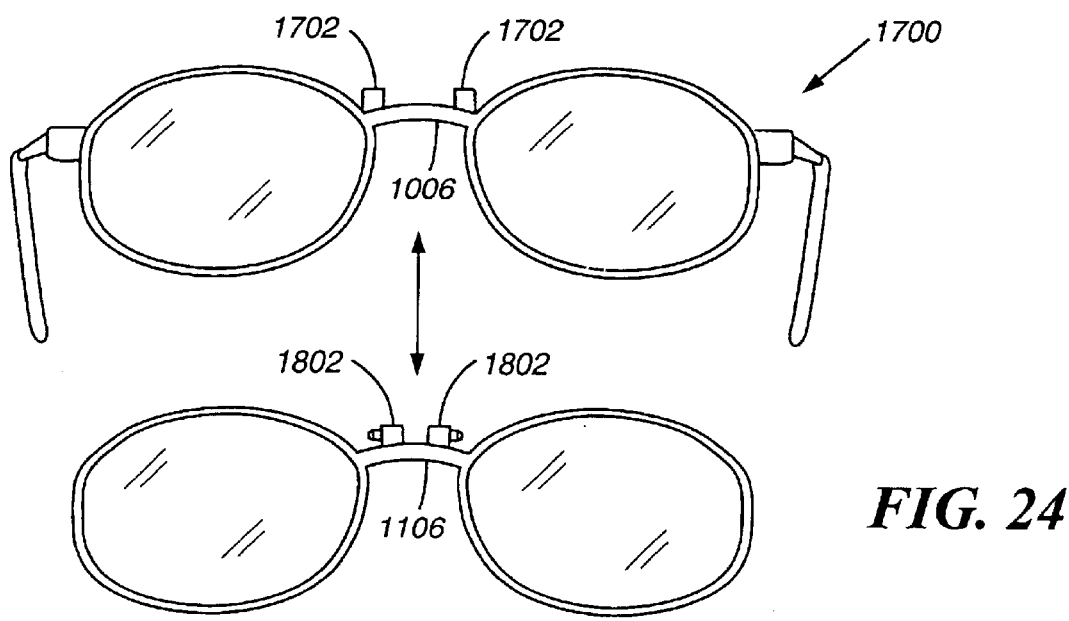

In FIG. 24, the open cavity mounting boxes 1702 and the spring-activated pin assemblies 1802 are located on the nose bridge 1006 of the primary spectacles and the nose bridge 1106 of the auxiliary spectacles, respectively.

Figure 25A:
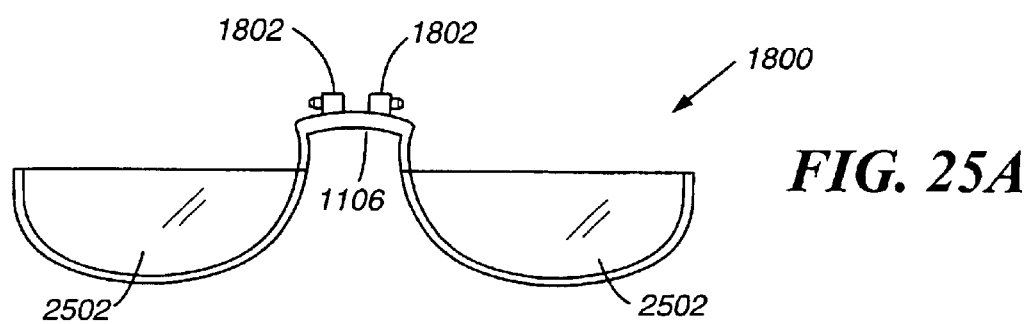
FIGS. 25A and 25B are front views of auxiliary spectacles containing half lenses according to alternative embodiments of the present invention.
Figure 25B:
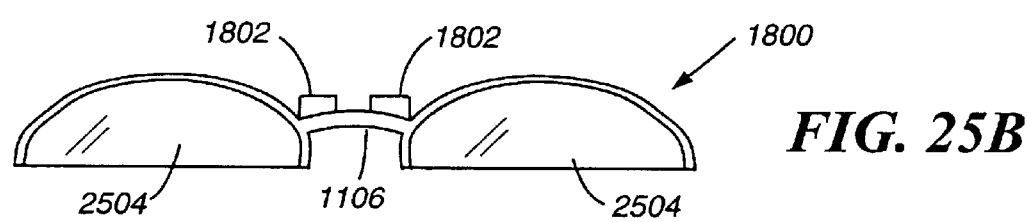

FIGS. 25A and 25B illustrate auxiliary spectacles 1800 comprising half lenses, designed to mount on the primary spectacles 1700 of FIG. 24. Like the auxiliary spectacles of FIG. 24, the spring-activated pin assemblies 1802 are located on the nose bridge 1106. FIG. 25A demonstrates auxiliary spectacles 1800 having lower-half lenses 2502, and FIG. 25B shows auxiliary spectacles 1800 having upper-half lenses 2504. shows auxiliary spectacles 1800 having upper-half lenses 2504.

Figure 26:
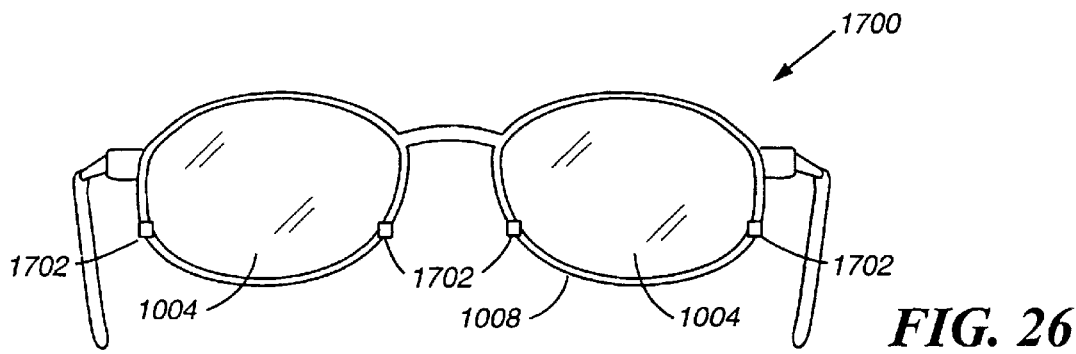
FIG. 26 is a front view of primary spectacles according to an alternative embodiment of the present invention.
Figure 27:
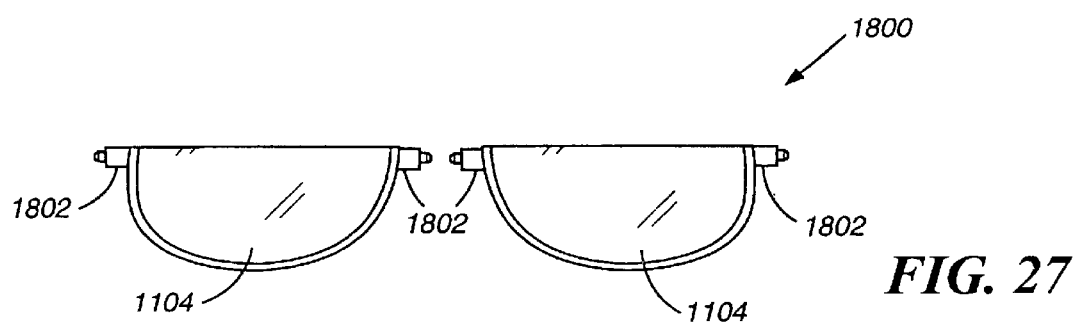
FIG. 27 is a front view of auxiliary lenses according to an alternative embodiment of the present invention.
Figure 28:
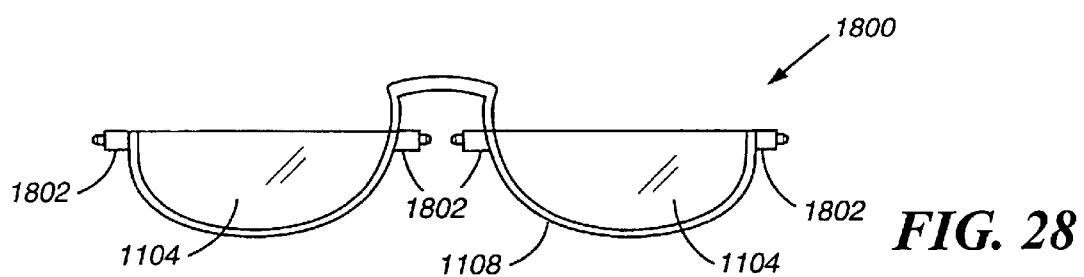
FIG. 28 is a front view of auxiliary spectacles according to an alternative embodiment of the present invention.

FIGS. 26, 27, and 28 illustrate an alternative embodiment of spectacles that have half lenses. In this case, FIG. 26 shows open cavity mounting boxes 1702 located on the primary lens frame 1008, midway down the primary lenses 1004. The auxiliary spectacles may either be separate lenses 1104 having spring-activated pins 1802 located on each side, as shown in FIG. 27, or the lenses 1104 may be connected by a frame 1108 having a nose bridge 1106 as shown in FIG. 28.

In one embodiment, the half-lenses of FIGS. 25–28 are sunglasses and in another embodiment, the lenses may have an optical magnification such as reading glasses or glasses used for distance viewing such as required for driving.

Figure 29:
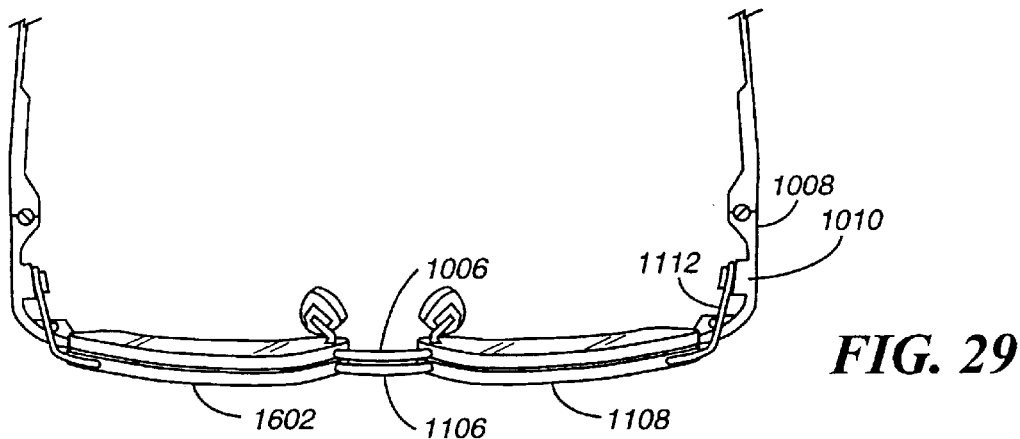
FIG. 29 is a top view, illustrating a bridge piece of the clip-on spectacles of FIGS. 11 and 18 on the outside of the primary spectacles, according to one embodiment of the present invention.
Figure 30:
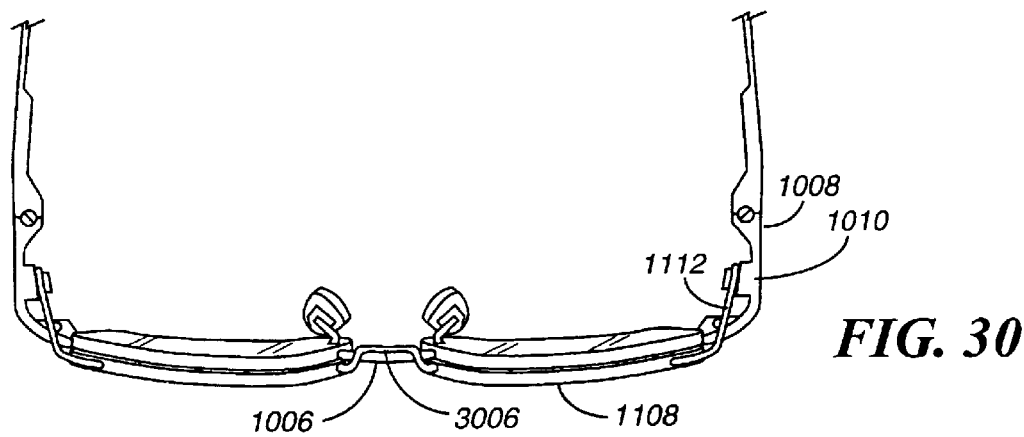
FIG. 30 is a top view, illustrating a bridge piece of the clip-on spectacles of FIGS. 11 and 18 on the inside of the primary spectacles, according to another embodiment of the present invention.

FIGS. 29 and 30 illustrate different embodiments of nose bridges. In FIG. 29, the nose bridge 1106 of the auxiliary spectacles rests in front of and parallel to the nose bridge 1006 of the primary spectacles. In FIG. 30, the nose bridge 3006 of the auxiliary spectacles rests above the nose bridge 1006 of the primary spectacles and extends rearward and downward to clip behind the nose bridge 1006.

Figure 31:
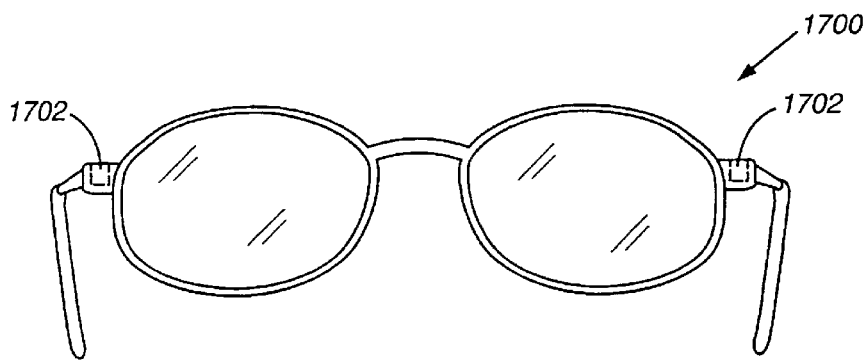
FIG. 31 is a front view of primary spectacles according to an alternative embodiment of the present invention.
Figure 32:
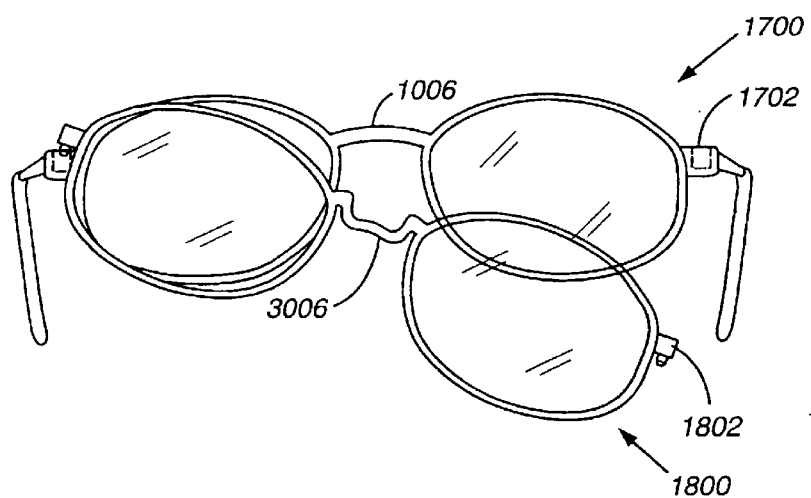
FIG. 32 is a front view, illustrating a state wherein the primary spectacles of FIG. 31 and the clip-on spectacles using the bride piece of FIG. 30 are being mated according to an alternative embodiment of the present invention.

FIGS. 31 and 32 demonstrate an alternative embodiment wherein the open-cavity mounting boxes 1702 on the primary spectacles 1700 open upwards. The corresponding pins 1802 on the auxiliary spectacles are designed to face downwards for mating, and the nose bridge 3006 of FIG. 30 is used to secure the auxiliary spectacles in place by locking underneath the nose bridge 1006 of the primary spectacles 1700.

It is important to note that the cavities can be formed as part of the primary frame such as a hole and in other embodiments as separately mounted boxes, rectangles or other geometric shapes that are formed to conform with the corresponding the spring-activated pins and/or pads.

In addition, through these embodiments described herein, the cavities and/or the open cavity mounting boxes are shown as part of the primary frames and the pads and/or spring-activated pin assemblies part of the auxiliary frame. In another embodiment the cavities and/or open cavity mounting boxes are formed on part of the auxiliary lenses and the spring-activated pin assemblies as part of the primary frames.

Figure 33D:
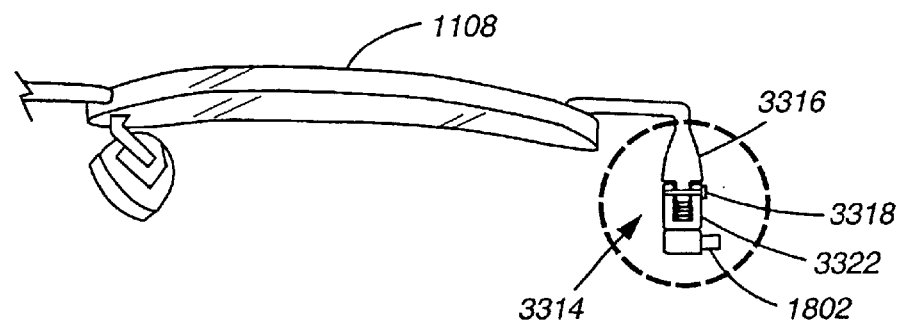
FIG. 33D is a top view of the clip-on spectacles of FIG. 33A, containing a detail view of the spring hinge frame extensions, according to an alternative embodiment of the present invention.

FIGS. 33A, 33B, 33C, 33D and 33E illustrate an alternative embodiment wherein the clip-on auxiliary spectacles contain hinged extension arms 3344 that include a spring hinge 3314 to join the front extension arm 3316 and the rear extension arm 3312. FIG. 33A illustrates a side view of an exemplary eyeglass frame assembly according to the present invention. The view of FIG. 33A shows a forward or front direction 3362 and a rear or rearward direction 3364 that will be referenced in the description of this embodiment. The view of FIG. 33A shows exemplary primary spectacles 3340 that include a primary lens frame 1008 and a frame extension 1012 and that is connected to the primary lens frame 1008. The frame extension 1012 is further shown to have a cavity 3302 that is formed on the inside surface of frame extension 1012. The inside surface in this embodiment is the surface that is on the side of the head of the user who is wearing the spectacles. The cavity 3302 of the exemplary embodiments is also shown to extend longitudinally along the frame extension 1012 from the end that connects to the primary lens frame 1008 to the opposite end of the frame extension 1012. The cavity 3302 of the exemplary embodiments is also shown to have a ridge 3346 as is described below.

FIG. 33A further shows the clip-on auxiliary spectacles 3342 that include an auxiliary lens frame 1108 to which an auxiliary lens 1104 is mounted. In the exemplary embodiments, the auxiliary lens 1104 is replaceable in order to allow the auxiliary spectacles to be used with various prescription and non-prescription lenses. The clip-on auxiliary spectacles 3342 also are shown to have hinged extension arms 3344 that include a front extension arm 3316 and a rear extension arm 3312. The hinged extension arm 3344 has a hinge 3314 between the front extension arm 3316 and a rear extension arm 3312. The hinge 3314 allows the hinged extension arm 3344 to flex in a plane perpendicular to the axis 3360, at the point of cavity 3302, of the primary frame extension 1012 and parallel to the plane of the auxiliary lens 1104. The exemplary embodiments of the present invention allow the rear extension arm 3312 to flex by rotating to positions that are both above and below a position that is parallel to a position that is linearly aligned with the front extension arm 3316.

The hinged extension arm 3344 of the exemplary embodiments causes the rear extension arm 3312 to remain fixed in one of three positions of rotation of the hinge 3314. The hinge 3314 of the exemplary embodiments is able to be moved between these three position by applying rotational force on the front extension arm 3316 relative to the rear extension arm 3312. The first position 3350 in which the hinge 3314 remains fixed has the rear extension arm 3312 linearly aligned with the front extension arm 3316. This first position 3350 results in the auxiliary lens 1104 being placed in front of the primary lens 1004 and therefore in the vision path of the user when the auxiliary spectacles 3342 are attached to the primary spectacles 3340. A second position 3352 in which the hinge 3314 of the exemplary embodiments remains fixed has the front extension arm 3316 at a clockwise angle relative to the rear extension arm 3312 relative to the view of FIG. 33A. The exemplary embodiments allows the hinge 3314 to rotate to an approximately ninety degrees (90°) position, thereby resulting in the auxiliary lens 1104 being placed at an approximately 90° angle relative to the primary lens 1004. Placing the hinge in this second position 3352 places the auxiliary lens 1104 at least partially outside the vision path of the user. The exemplary embodiments further allow the hinge 3314 to be moved to and remain fixed in a third position 3354 so that the front extension arm 3316 is at a counter-clockwise position relative to the rear extension arm 3312. This third position 3354 is used in the exemplary embodiments to place the rear extension arm 3312 closer to the auxiliary lens frame 1108 and to therefore not extend away from the auxiliary lens frame. The third position 3354 of the exemplary embodiments reduces the likelihood that the hinged extension arm 3344 will catch on material or a surface and brake or become damaged when the auxiliary spectacles 3342 are not attached to the primary spectacles 3340. Alternative embodiments of the present invention do not allow movement of the hinge into the third position and therefore only have two positions in which the hinge 3344 remains fixed.

A pin 3348 is located on the outside surface of the end of the hinged extension arm 3344 that is opposite the end that is connected to the auxiliary lens frame. Various embodiments of the present invention use a pin 3348 that is similar to the pad 1110 as is illustrated in FIG. 11. The exemplary embodiments incorporate a pin 3348 that is part of a spring activated pin assembly 1802 as is shown in detail in FIG. 20E. The outside surface of the exemplary embodiments is the surface of the hinged extension arm that is opposite the surface facing the wearer of spectacles upon which the clip-on auxiliary spectacles are attached.

FIG. 33B shows the auxiliary clip on spectacles 3342 attached to the primary spectacles 3340. The auxiliary clip-on spectacles 3342 of the exemplary embodiments are attached to the primary spectacles 3340 by placing the pin 3348 into the cavity 3302. The pin 3348 of the preferred embodiment positively engages the cavity 3302 due to outward springing forces provided by the hinged extension arms 3344, the springing forces applied by spring activated pin assembly 1802, and by the springing forces applied by flexing of the auxiliary lens frame 1108 itself. In the exemplary embodiments, the cavity 3302 has a height that matches the height of the pin 3348, but the length of the cavity 3302 is larger than the width of the pin 3348. This allows the pin 3348 to move longitudinally along the cavity 3302 and vary the longitudinal position of the clip-on auxiliary lens frame 1108 relative to the primary spectacles 3340 in order to facilitate raising and lowering of the auxiliary frame as is discussed below. Preferred embodiments of the present invention incorporate a pin 3348 with a rectangular cross-section that has a height that is slightly smaller that the height of cavity 3302 so as to allow the pin 3348 to fit into cavity 3302. The width of the pin 3348, i.e., the horizontal dimension of the "face" of the pin 3348 that is to be aligned with the lateral dimension of cavity 3302 as is shown in FIG. 33A, is longer than the height of the rectangular cavity 3302 in the exemplary embodiments. Making the width of pin 3348 larger than the height of cavity 3302 ensures proper orientation of the pin 3348 into cavity 3302. The use of a pin 3348 with a width greater than the height of the cavity 3302 prevents insertion of the pin 3348 with the wrong orientation, i.e., at an angle of 90° relative to the desired orientation.

Proper placement of the auxiliary lens frame 1108 when the auxiliary lenses 1104 are in the vision path of the user, as is shown in FIG. 33B, is for the pin 3348 to be located away from the front of the cavity 3302. This causes the auxiliary lens frame 1108 to be positioned close to the primary lens frame 1008. Embodiments of the present invention use friction between the pin 3348 and the cavity 3302 to hold the auxiliary spectacles 3342 in the proper location. In another embodiment, an indentation, dimple or ridge 3346 is placed along the lower opening of cavity 3302 to ensure proper placement of the pin 3348 within the slot 3302. The ridge 3346 of the exemplary embodiments is sufficiently high to impede the movement of the pin 3348 within the cavity 3302 but is low enough to accommodate movement of the pin 3348 over the ridge by deformation of the pin 3348. This function is facilitated if the pins 3346 are made of materials such as rubber, silicon, or plastic. The exemplary embodiments locate the ridge at a distance from the rear of cavity 3302 that is equal to the width of the pin 3348 so that the pin is located in the rearward-most position of the cavity 3302. Alternative embodiments have a ridge to hold the pin 3348 in the proper position, but the cavity 3302 is such that this position is not in the rearward most position of the cavity. Other embodiments use alternative means to ensure the desired placement of the auxiliary lens frame 1108 relative to the primary lens frame 1008. These alternative means include clips on the auxiliary lens frame 1108 that engage the primary lens frame 1008. These clips securely hold the auxiliary lens frame to the primary lens frame when the auxiliary lens frame is placed or flipped into the "down" position so that the auxiliary lens 1104 is placed in the vision path of the user. An example of such a clip is the nose bridge 3006 attached to the auxiliary spectacles as is illustrated in FIG. 30. Yet other embodiments utilize a cavity 3302 that is substantially the same size as pin 3348.

FIG. 33C illustrates the configuration of the clip-on auxiliary spectacles when the auxiliary lenses 1104 mounted on the auxiliary lens frame 1108 are positioned to be partially outside the vision path of the user. The spring hinge 3314 is shown in a partially bent position. The spring hinge 3314 of the exemplary embodiments bends a full ninety degrees (90°) so as to cause the auxiliary lenses 1104 to be positioned outside of the vision path of the user. The spring hinge 3314 is also able to be in the straight position that is illustrated in FIGS. 33A and 33B so as to cause the auxiliary lenses 1104 to be positioned in the vision path of the user. The operation of the hinge in these embodiments is facilitated by the sliding of pin 3348 along cavity 3302, as is described above.

Figure 33E:
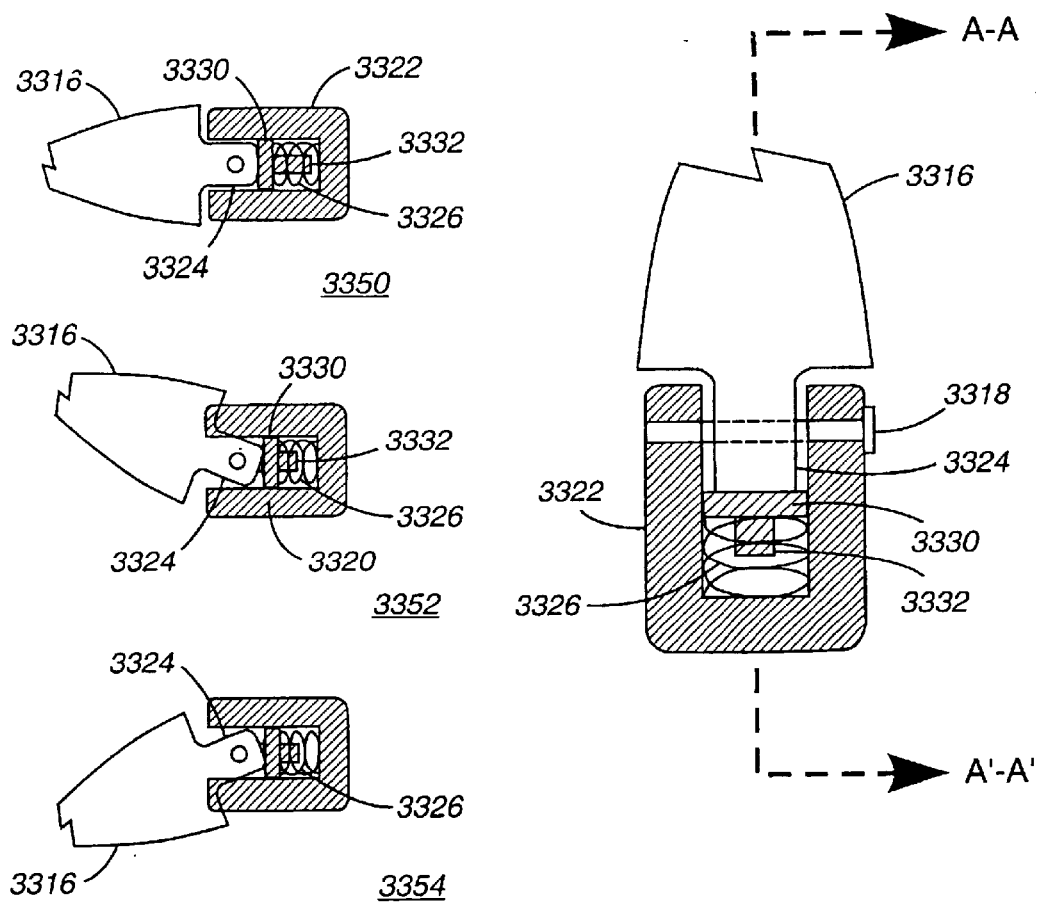
FIG. 33E is a side view of the spring hinge frame extensions of FIG. 33A, containing an exploded view of the spring hinge and illustrating two positions of the hinge, according to an alternative embodiment of the present invention.

The spring hinge 3314, shown in detail in FIGS. 33D and 33E, joins the rear extension arm 3312 and a front extension arm 3316 that are part of the hinged extension arm 3344. The front extension arm 3316 has one end mounted to the auxiliary frames 1108, and a second end that contains a tongue 3324 having a hole through the center. The rear extension arm 3312 is able to contain a replaceable spring-activated pin assembly 1802 or other pin on one end, as was previously mentioned. The opposite end 3322 of the rear extension arm 3312 opens into a U-shaped chamber 3320. A spring 3326 is inserted into the U-shaped chamber 3320 and the tongue 3324 of the first piece 3316 of the frame extension arm is secured onto the rear extension arm 3312. The tongue 3324 of the exemplary embodiments is secured to the U-shaped chamber 3320 by a spindle, post or other means such as a screw 3318, which extends through the U-shaped chamber 3320 and the tongue 3324. The spring 3326 is compressed between the back of the U-shaped chamber 3320 and the tongue 3324, exerting a force on the front extension arm 3316 when the auxiliary glasses are in the "flipped" position, which aids in keeping the auxiliary lens frame 1108 in place.

FIG. 33E demonstrates the action of the spring hinge 3314 while in a first position 3350 where the auxiliary glasses are in the path of vision, and a second position 3352 where the auxiliary glasses are "flipped up" away from the path of vision. Embodiments of the present invention further contain a spring cap 3330. The spring cap 3330 is an optional component that allows for improved interaction of the spring 3326 with the tongue 3324. The spring cap 3330 has a cap shaft 3332 that extends into the interior area of the spring 3326 so as to ensure proper placement of the spring cap 3330. The spring cap 3330 has a cap head that is formed by the "top" of the spring cap 3330 that the part of the spring cap 3330 that engages the spring 3326 and has a dimension slightly smaller than the interior of the U-shaped chamber 3320. Alternative embodiments of the present invention use a spring cap 3330 that does not have a cap shaft 3332. These embodiments use a spring cap 3330 that only has a cap head.

Although specific embodiments of the invention have been disclosed, it will be understood by those having skill in the art that changes can be made to this specific embodiment without departing from the spirit and scope of the invention. The scope of the invention is not to be restricted, therefore, to specific embodiments, and it is intended that the appended claims cover any and all such applications, modifications, and embodiments within the scope of the present invention.

What is claimed is:

1. An eyeglass frame assembly for coupling a set of clip-on auxiliary spectacles to primary spectacles, the assembly comprising:

primary spectacles, including:
   a primary lens frame;
   a pair of frame extensions wherein each frame extension of the pair of frame extensions has a first end and a second end, the first end of each frame extension connecting the frame extension to the primary lens frame, and wherein each of the extensions has an inside surface and an outside surface;
   a plurality of cavities, wherein each cavity of the plurality of cavities is formed on the inside surface of one of the pair extensions, wherein each of the cavities has an opening in the inside surface; and
   a pair of arms, wherein each arm of the pair of arms is connected by hinges to the second end of each frame extension, wherein the arms extend rearward to engage a user's ears; and clip-on auxiliary spectacles, including:
   an auxiliary lens frame, wherein the auxiliary lens frame is able to mount at least one lens;
   a pair of hinged extension arms, wherein each of the arms has an inside surface, an outside surface, a first end and a second end, each first end connected to the auxiliary lens frame, and wherein each of the arms comprises a hinge located between the first end and the second end; and
   a plurality of pins, wherein each pin of the plurality of pins is located on the outside surface of one of the pair of arms, wherein each of the pins are positively engages one of the cavities under an outward force.

2. The assembly according to claim 1, wherein the hinged extension arms comprise hinges that allow the auxiliary lens frame to be positioned in at least two positions, wherein the at least two positions comprise:
   a first position wherein at least one lens of the an at least one lens is in a vision path of a user; and
   a second position wherein the at least one lens of the at least one lens is at least partially outside the vision path of the user.

3. The assembly according to claim 1, wherein at least some of the outward force is provided by spring-activated pins.

4. The assembly according to claim 1, wherein at least some of the outward force is provided by a spring action of the auxiliary lens frame.

5. The assembly according to claim 1, wherein one or more of the cavities are contained within a box mounted on one of the inside surfaces of the frame extensions.

6. The assembly according to claim 1, wherein each hinge allows movement of at least a part of the hinged extension arm so that the part of the hinged extension arm becomes closer to the auxiliary lens frame.

7. The assembly according to claim 1, wherein each of the cavities extend along the inside surface of the pair of arms so as to allow lateral movement of the engaged pin within the cavity.

8. The assembly according to claim 7, wherein each of the cavities comprises at least one ridge to impede lateral movement of the pin along the cavity.

9. The assembly according to claim 1, wherein each hinge comprises:
- a U-shaped chamber having a top surface, a bottom surface, a front surface, and a rear surface, the top surface having an opening for inserting a spindle, the bottom surface having a hole aligned with the opening for fastening the spindle;
- a spring having a first end and a second end, the first end in contact with the rear surface of the open-cavity box;
- a tongue having a first end, a second end, and a slot, the first end in contact with the second end of the spring and contained within the U-shaped chamber, the second end extending beyond the U-shaped chamber, the slot being formed longitudinally within the pin; and
- a post, extending from the top surface of the U-shaped chamber, through the slot in the pin, and terminating through the hole in the bottom surface of the U-shaped chamber, wherein the post acts as the spindle and allows the tongue to pivot about the post.

10. The assembly according to claim 9, wherein the spring comprises an interior surface and wherein the assembly further comprises a spring cap, wherein the spring cap comprises a cap head and a cap shaft, and wherein the cap head engages the second end of the spring and wherein the cap shaft is contained within the interior surface of the spring.

11. Clip-on auxiliary spectacles for use in conjunction with primary spectacles, the clip-on auxiliary spectacles comprising:
- an auxiliary lens frame that is able to hold at least one lens;
- a pair of hinged extension arms, wherein each of the arms has an inside surface, an outside surface, a first end and a second end, each first end connected to the auxiliary lens frame, and wherein each of the arms comprises a-hinge located between the first end and the second end; and
- a pair of pins, wherein one pin of the pair of pins is located on the outside surface of each of the pair of arms and wherein each pin of the pair is positioned so as to positively engage a cavity.

12. The spectacles according to claim 11, wherein the hinged extension arms comprise hinges that allow the auxiliary lens frame to be positioned in at least two positions, wherein the at least two positions comprise:
- a first position wherein at least one lens of the an at least one lens is in a vision path of a user; and
- a second position wherein the at least one lens of the at least one lens is at least partially outside the vision path of the user.

13. The spectacles according to claim 11, wherein at least one pin of the pair of pins is urged into the cavity by spring-activated pins.

14. The spectacles according to claim 11, wherein the pin is urged into the cavity by a spring action of the auxiliary lens frame.

15. The spectacles according to claim 11, wherein each hinge moves so as to move the second end closer to the auxiliary lens frame.

16. The spectacles according to claim 11, wherein each hinge comprises:
- a U-shaped chamber having a top surface, a bottom surface, a front surface, and a rear surface, the top surface having an opening for inserting a spindle, the bottom surface having a hole aligned with the opening for fastening the spindle;
- a spring having a first end and a second end, the first end in contact with the rear surface of the open-cavity box;
- a pin having a first end, a second end, and a slot, the first end in contact with the second end of the spring and contained within the U-shaped chamber, the second end extending beyond the U-shaped chamber, the slot being formed longitudinally within the pin; and
- a post, extending from the top surface of the U-shaped chamber, through the slot in the pin, and terminating through the hole in the bottom surface of the U-shaped chamber, wherein the post acts as the spindle and allows the pin to pivot about the post.

17. The spectacles according to claim 16, wherein the spring comprises an interior surface and wherein the assembly further comprises a spring cap, wherein the spring cap comprises a cap head and a cap shaft, and wherein the cap head engages the second end of the spring and wherein the cap shaft is contained within the interior surface of the spring.

18. An eyeglass frame assembly for coupling clip-on auxiliary spectacles to primary spectacles, the assembly comprising:
- a primary lens frame, wherein the primary lens frame includes at least one pair of open cavity mounting boxes each with an opening for receiving a corresponding tongue therein; and
- an auxiliary lens frame with at least one or more pair of spring pins and/or spring-activated pins for engaging the open cavities boxes of the primary lens frame;
- wherein the auxiliary lens frame is pivotally mounted on the primary frame so that the auxiliary lens frame can be positioned in a least two positions, as follows:
- a first position which is in a vision path of a user; and
- a second position which is at least partially outside the vision path of the user.

* * * * *